(12) United States Patent
Fleischman et al.

(10) Patent No.: US 8,442,521 B2
(45) Date of Patent: *May 14, 2013

(54) CARRIER CONFIGURATION AT ACTIVATION

(75) Inventors: David Fleischman, Gilroy, CA (US); Patrick Coffman, San Francisco, CA (US); Jeremy Wyld, Simi Valley, CA (US); Brian Cassidy, San Francisco, CA (US); Gregory N. Christie, San Jose, CA (US)

(73) Assignee: Apple Inc., Cupertino, CA (US)

( * ) Notice: Subject to any disclaimer, the term of this patent is extended or adjusted under 35 U.S.C. 154(b) by 509 days.

This patent is subject to a terminal disclaimer.

(21) Appl. No.: 12/202,846

(22) Filed: Sep. 2, 2008

(65) Prior Publication Data

US 2009/0061840 A1   Mar. 5, 2009

Related U.S. Application Data

(60) Provisional application No. 60/969,924, filed on Sep. 4, 2007.

(51) Int. Cl.
*H04M 3/00* (2006.01)

(52) U.S. Cl.
USPC ..... 455/432.1; 455/418; 455/411; 455/414.1; 455/435.1

(58) Field of Classification Search .................. 455/419, 455/418, 411, 414.1, 435.1, 432.2

See application file for complete search history.

(56) References Cited

U.S. PATENT DOCUMENTS

| | | |
|---|---|---|
| 3,876,942 A | 4/1975 | Koster et al. |
| 5,386,455 A | 1/1995 | Cooper |
| 5,835,061 A | 11/1998 | Stewart |
| 6,134,435 A | 10/2000 | Zicker et al. |
| 6,137,783 A | 10/2000 | Sailberg |
| 6,185,427 B1 | 2/2001 | Krasner et al. |
| 6,199,045 B1 | 3/2001 | Giniger et al. |
| 6,259,405 B1 | 7/2001 | Stewart et al. |
| 6,263,214 B1 | 7/2001 | Yazaki et al. |
| 6,323,846 B1 | 11/2001 | Westerman et al. |
| 6,456,234 B1 | 9/2002 | Johnson |
| 6,487,403 B2 | 11/2002 | Carroll |

(Continued)

FOREIGN PATENT DOCUMENTS

| | | |
|---|---|---|
| DE | 198 23 074 | 11/1999 |
| EP | 0 367 361 | 5/1990 |

(Continued)

OTHER PUBLICATIONS

International Search Report and Written Opinion, dated Apr. 24, 2008, issued in International Application No. PCT/US2008/050340.

(Continued)

*Primary Examiner* — Kamran Afshar
*Assistant Examiner* — Shahriar Behnamian
(74) *Attorney, Agent, or Firm* — Gazdzinski & Associates, PC

(57) ABSTRACT

Methods, systems, and computer-readable medium for providing telecommunications carrier configuration at activation of a mobile device. In one implementation, a method is provided. The method includes receiving a request for activation of a mobile device, and during activation of the mobile device, determining for the mobile device a telecommunications carrier from a number of telecommunications carriers, and identifying information associated with the determined telecommunications carrier for configuring the mobile device.

20 Claims, 9 Drawing Sheets

U.S. PATENT DOCUMENTS

| | | | |
|---|---|---|---|
| 6,570,557 | B1 | 5/2003 | Westerman et al. |
| 6,611,687 | B1 | 8/2003 | Clark et al. |
| 6,615,213 | B1 | 9/2003 | Johnson |
| 6,677,894 | B2 | 1/2004 | Sheynblat et al. |
| 6,677,932 | B1 | 1/2004 | Westerman |
| 6,731,238 | B2 | 5/2004 | Johnson |
| 6,879,825 | B1 | 4/2005 | Daly |
| 6,888,536 | B2 | 5/2005 | Westerman et al. |
| 7,054,642 | B1 | 5/2006 | Matz et al. |
| 7,187,997 | B2 | 3/2007 | Johnson |
| 7,710,290 | B2 | 5/2010 | Johnson |
| 2002/0037714 | A1* | 3/2002 | Takae et al. ............ 455/419 |
| 2002/0082048 | A1 | 6/2002 | Toyoshima |
| 2002/0085530 | A1 | 7/2002 | Toyoshima |
| 2002/0197992 | A1 | 12/2002 | Nizri et al. |
| 2003/0083068 | A1 | 5/2003 | Wong |
| 2003/0119515 | A1 | 6/2003 | Holler et al. |
| 2004/0102183 | A1 | 5/2004 | Haub et al. |
| 2004/0121802 | A1 | 6/2004 | Kim et al. |
| 2004/0142725 | A1 | 7/2004 | Kim |
| 2004/0176133 | A1 | 9/2004 | Lipsit |
| 2004/0235458 | A1 | 11/2004 | Walden |
| 2004/0242224 | A1 | 12/2004 | Janik et al. |
| 2004/0248550 | A1 | 12/2004 | Hausner et al. |
| 2005/0009502 | A1 | 1/2005 | Little et al. |
| 2005/0054338 | A1 | 3/2005 | Hosokawa |
| 2005/0079863 | A1 | 4/2005 | Macaluso |
| 2005/0120209 | A1 | 6/2005 | Kwon et al. |
| 2005/0141438 | A1 | 6/2005 | Quetglas et al. |
| 2006/0035631 | A1* | 2/2006 | White et al. ............ 455/418 |
| 2006/0046717 | A1 | 3/2006 | Bovell |
| 2006/0143098 | A1 | 6/2006 | Lazaridis |
| 2006/0154647 | A1 | 7/2006 | Choi |
| 2007/0082655 | A1 | 4/2007 | Link et al. |
| 2007/0167161 | A1* | 7/2007 | Cheng et al. ............ 455/435.1 |
| 2007/0271603 | A1* | 11/2007 | Lee et al. ............ 726/9 |
| 2008/0003980 | A1 | 1/2008 | Voss et al. |
| 2008/0166993 | A1 | 7/2008 | Gautier et al. |
| 2008/0167027 | A1 | 7/2008 | Gautier et al. |
| 2008/0167036 | A1 | 7/2008 | Bush et al. |
| 2008/0268820 | A1* | 10/2008 | Wilson et al. ............ 455/414.1 |
| 2008/0318550 | A1 | 12/2008 | DeAtley |
| 2009/0061840 | A1 | 3/2009 | Fleischman et al. |
| 2009/0061934 | A1 | 3/2009 | Hauck et al. |
| 2009/0181662 | A1 | 7/2009 | Fleischman et al. |

FOREIGN PATENT DOCUMENTS

| | | |
|---|---|---|
| EP | 1 276 339 | 1/2003 |
| EP | 1 361 775 | 11/2003 |
| EP | 1 534 043 | 5/2005 |
| EP | 1 679 925 | 7/2006 |
| EP | 1 748 661 | 1/2007 |
| EP | 2 079 256 | 7/2009 |
| GB | 2 428 544 | 1/2007 |
| WO | 97/42783 | 11/1997 |
| WO | WO 01/15414 | 3/2001 |
| WO | 02/058361 | 7/2002 |
| WO | WO 03/041443 | 5/2003 |
| WO | WO 2004/057485 | 7/2004 |
| WO | WO 2004/082310 | 9/2004 |
| WO | 2004/105421 | 12/2004 |
| WO | WO 2006/054980 | 5/2006 |
| WO | 2006/084183 | 8/2006 |
| WO | 2007/079425 | 7/2007 |
| WO | WO 2008/086255 | 7/2008 |
| WO | WO 2009/002649 | 12/2008 |
| WO | WO 2009/032853 | 3/2009 |

OTHER PUBLICATIONS

International Preliminary Report on Patentability, dated Jul. 16, 2009, issued in International Application No. PCT/US2008/050340.

European Search Report, dated Apr. 24, 2008, issued in European Application No. 08250053.

International Preliminary Report on Patentability in PCT/US2008/75138 mailed Mar. 18, 2010, 10 pages.

International Preliminary Report on Patentability in PCT/US2009/31016 mailed Jul. 29, 2010, 10 pages.

Invitation to Pay Fees and Partial International Search Report, dated Oct. 22, 2008, issued in International Application No. PCT/US2008/064971.

International Search Report and Written Opinion, dated Jan. 5, 2009, issued in International Application No. PCT/US2008/050343.

International Preliminary Report on Patentability, dated Jul. 7, 2009, issued in International Application No. PCT/US2008/050343.

European Extended Search Report, dated May 5, 2008, issued in European Application No. 08250050.5.

De Atley et al., Service Provider Activation, U.S. Appl. No. 11/849,286, filed Sep. 1, 2007.

International Search Report and Written Opinion of the International Searching Authority, PCT Application Serial No. PCT/US2009/031016, May 27, 2009, 14 pp.

International Preliminary Report on Patentability, dated Dec. 22, 2009, issued in International Application No. PCT/US2008/064971.

PCT, "International Search Report and Written Opinion", PCT/US2008/009009, (Nov. 17, 2008), whole document.

PCT, "International Search Report and Written Opinion", PCT/US2008/009007, (Nov. 18, 2008), whole document.

International Search Report and Written Opinion of the International Searching Authority, PCT Application Serial No. PCT/US2008/075138, Feb. 6, 2009, 16 pp.

Extended European Search Report in EP 11 16 4920 dated Sep. 7, 2011, 10 pages.

* cited by examiner

CARRIER CONFIGURATION AT ACTIVATION

CROSS-REFERENCE TO RELATED APPLICATIONS

This application claims priority to U.S. Provisional Patent Application Ser. No. 60/969,924 filed Sep. 4, 2007, and entitled "Carrier Configuration at Activation," the contents of which are incorporated herein by reference.

TECHNICAL FIELD

The subject matter of this patent application is generally related to mobile devices.

BACKGROUND

Modern mobile devices can provide a number of telecommunications services, including telephony service, short messing service (SMS), and e-mail communication service. Conventional mobile devices with telephony applications are configured for a particular telecommunications carrier. Typically, both the software and the hardware of these mobile devices are configured for a particular carrier prior to activation of the mobile device. For example, carrier-specific configuration of the software requires separate software builds for each telecommunications carrier that will be supported by the mobile device, increasing the total development time of the mobile device with the addition of each carrier. Carrier-specific configuration of mobile device hardware occurs at the time the mobile device is manufactured. For example, radio boards in mobile devices are provisioned to only operate with smart cards associated with a particular telecommunications carrier. Device configuration at the manufacturing stage requires at least one factory line for each telecommunications carrier supported by the mobile device. In addition, a user of a conventional mobile device is limited to using the mobile device with the particular telecommunications carrier for which the mobile device was configured. If the user wishes to switch to a different telecommunications carrier, the user would need a separate mobile device specifically configured for the desired carrier.

SUMMARY

A technique, method, apparatus, and system are described to provide telecommunications carrier configuration at activation of a mobile device. In general, in one aspect, a method is provided. The method includes receiving a request for activation of a mobile device, and during activation of the mobile device, determining for the mobile device a telecommunications carrier from a number of telecommunications carriers, and identifying information associated with the determined telecommunications carrier for configuring the mobile device.

Implementations can include one or more of the following features. The method can further include, during activation of the mobile device, transmitting to the mobile device the identified information associated with the determined telecommunications carrier for configuring the mobile device. The method can further include transmitting a request for activation of a mobile device, and during activation of the mobile device, receiving information associated with a telecommunications carrier, and configuring the mobile device using the received information. The mobile device can be a personal digital assistant, a cellular telephone, a smart phone, an EGPRS mobile phone, or a media player. Configuring the mobile device can include configuring a software stack of the mobile device or configuring a radio board of the mobile device. The mobile device can include a multi-touch-sensitive display.

In one aspect, a method is provided. The method includes receiving a request to reconfigure a mobile device that is configured based on a first telecommunications carrier, determining for the mobile device a second telecommunications carrier from a number of telecommunications carriers, and identifying information associated with the determined second telecommunications carrier for reconfiguring the mobile device.

Implementations can include one or more of the following features. The method can further include transmitting to the mobile device the identified information associated with the determined second telecommunications carrier for reconfiguring the mobile device. The request to reconfigure the mobile device can include an identifier for a smart card installed in the mobile device, and determining the second telecommunications carrier can include determining that the smart card identifier is associated with the second telecommunications carrier.

In one aspect, a method is provided. The method includes transmitting a request to reconfigure a mobile device that is configured based on a first telecommunications carrier, receiving information associated with a second telecommunications carrier, and reconfiguring the mobile device using the received information.

Implementations can include one or more of the following features. Reconfiguring the mobile device can include reconfiguring a software stack of the mobile device or reconfiguring one or more hardware components of the mobile device. The request to reconfigure can be transmitted in response to detecting that a first smart card installed in the mobile device is replaced with a second smart card. The method can further include notifying one or more applications on the mobile device of the replacement of the first smart card with the second smart card. The method can further include reconfiguring one or more applications on the mobile device based on the received information associated with the second telecommunications carrier.

In one aspect, a system is provided. The system includes an access device, and a mobile device coupled to the access device, wherein the mobile device is configured to transmit to the access device a request for activation of the mobile device, and during activation of the mobile device, receive from the access device information associated with a first telecommunications carrier, and configure the mobile device using the received information associated with the first telecommunications carrier.

Implementations can include one or more of the following features. The access device can be configured to receive from the mobile device the request for activation of the mobile device, and during activation of the mobile device, determine for the mobile device the first telecommunications carrier from a number of telecommunications carriers, identify information associated with the first telecommunications carrier for configuring the mobile device, and transmit to the mobile device the information associated with the first telecommunications carrier for configuring the mobile device. The information associated with the first telecommunications carrier can indicate or include one or more settings for the first telecommunications carrier which should be enabled on the mobile device. The request for activation of the mobile device can include an identifier for the mobile device and an identifier for a first smart card installed in the mobile device, and the first telecommunications carrier can be associated with the identifier for the first smart card.

Implementations can include one or more of the following features. The mobile device can be further configured to detect when the first smart card installed in the mobile device is replaced with a second smart card, and in response to the detected replacement of the first smart card with the second smart card, transmit to the access device a request to reconfigure the mobile device. The access device can be further configured to receive from the mobile device the request to reconfigure the mobile device, determine for the mobile device a second telecommunications carrier from the number of telecommunications carriers, identify information associated with the second telecommunications carrier for reconfiguring the mobile device, and transmit to the mobile device the information associated with the second telecommunications carrier for reconfiguring the mobile device. The mobile device can be further configured to receive the information associated with the second telecommunications carrier, and reconfigure the mobile device using the received information associated with the second telecommunications carrier. Reconfiguring the mobile device can further include reconfiguring one or more hardware components or a software stack of the mobile device. The mobile device can include a multi-touch-sensitive display.

Particular embodiments of the subject matter described in this specification can be implemented to realize one or more of the following advantages. Differentiation of mobile devices for particular telecommunications carriers can be postponed until the activation stage. Generic software is used to configure mobile devices for any number of telecommunication carriers in any number of countries, reducing total software development time. Generic hardware on a mobile device reduces the need for customization and differentiated inventory at the manufacturer. The generic software and hardware can self-configure for a particular telecommunications carrier when the mobile device is activated.

DETAILED DESCRIPTION

Example Mobile Device

Figure 1A:
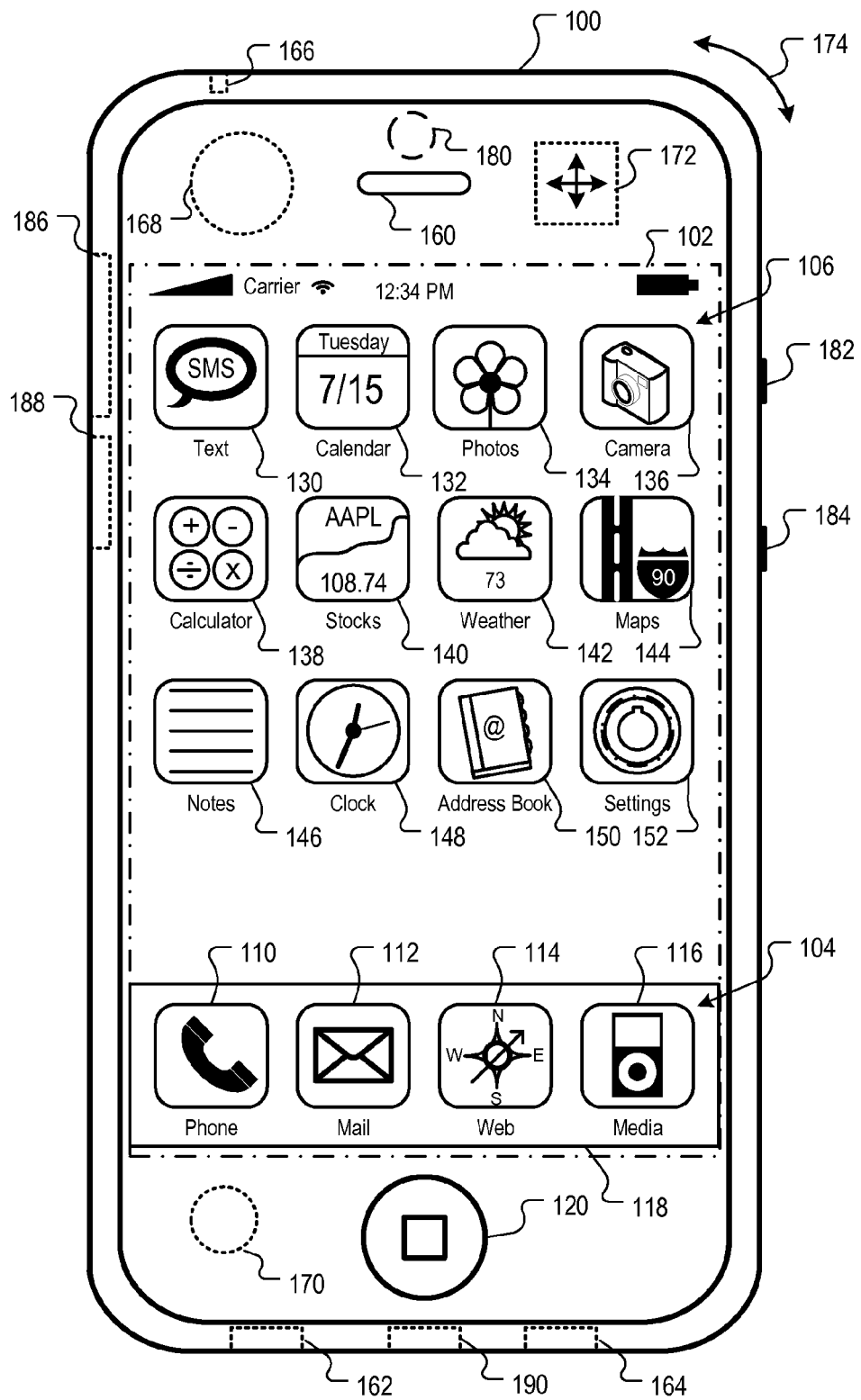
FIG. 1A is a block diagram of an example mobile device.

FIG. 1A is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular display objects 104, e.g., the phone object 110, the e-mail object 112, the Web object 114, and the media player object 116, can be displayed in a menu bar 118. In some implementations, device functionalities can be accessed from a top-level graphical user interface, such as the graphical user interface illustrated in FIG. 1A. Touching one of the objects 110, 112, 114, or 116 can, for example, invoke corresponding functionality.

In some implementations, the mobile device 100 can implement network distribution functionality. For example, the functionality can enable the user to take the mobile device 100 and provide access to its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1A can be restored by pressing a button 120 located near the bottom of the mobile device 100. In some implementations, each corresponding device functionality may have corresponding "home" display objects displayed on the touch-sensitive display 102, and the graphical user interface environment of FIG. 1A can be restored by pressing the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality; likewise, each selection of a display object 132, 134, 136, 138, 140, 142, 144, 146, 148, 150, and 152 can invoke a corresponding object environment and functionality.

Additional and/or different display objects can also be displayed in the graphical user interface of FIG. 1A. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, an up/down button 184 for volume control of the speaker 160 and the microphone 162 can be included. The mobile device 100 can also include an on/off button 182 for a ring indicator of incoming phone calls. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, a display screen, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol. In some implementations, a TCP/IP over USB protocol can be used, as described in U.S. Provisional Patent Application No. 60/945,904, filed Jun. 22, 2007, for "Multiplexed Data Stream Protocol," which provisional patent application is incorporated by reference herein in its entirety.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), general packet radio service (GPRS), Enhanced Data GSM Environment (EDGE), etc.

Example Mobile Device

Figure 1B:
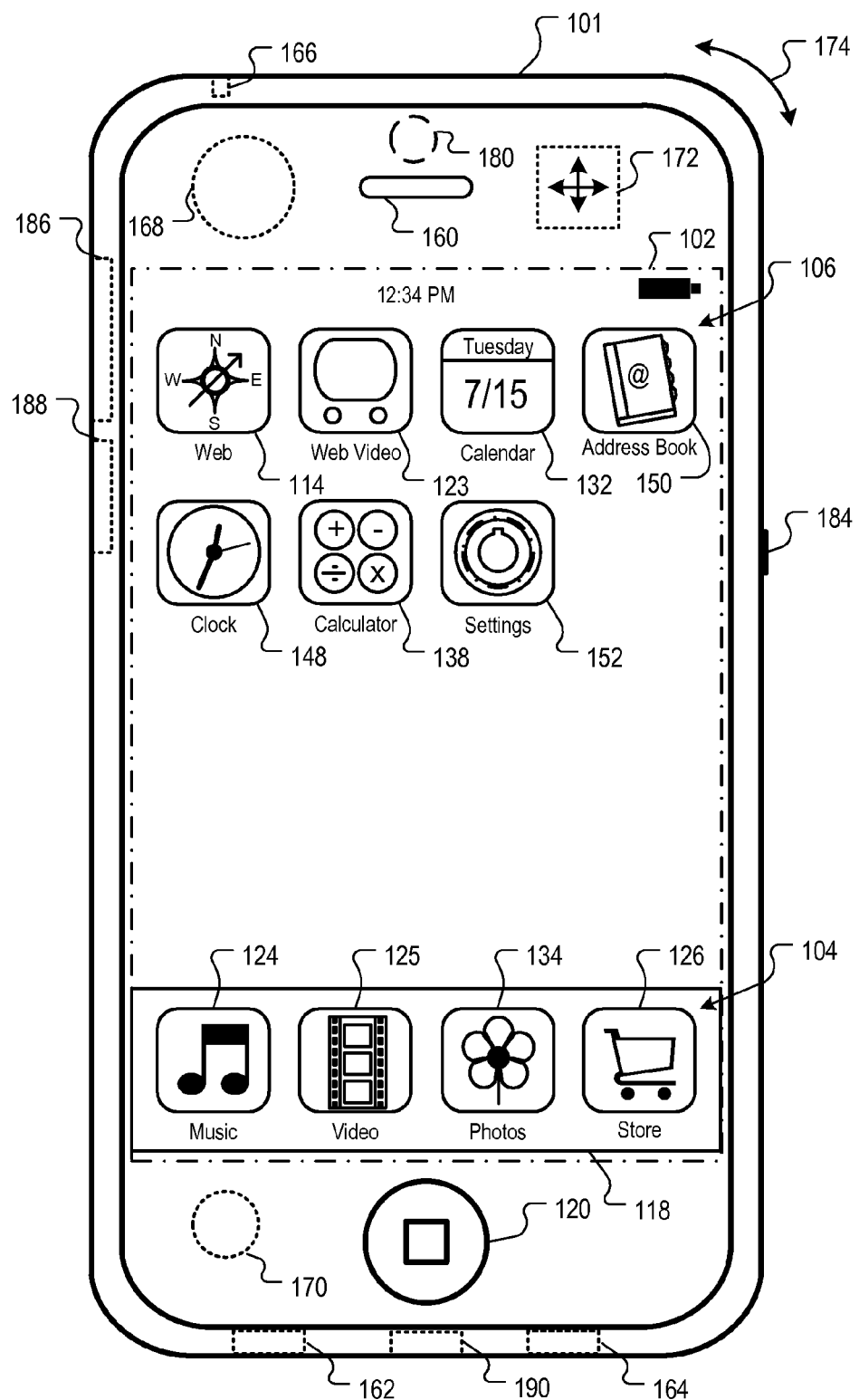
FIG. 1B is a block diagram of an example mobile device.

FIG. 1B is a block diagram of an example mobile device 101. The mobile device 101 can be, for example, a handheld computer, a personal digital assistant, a network appliance, a camera, a network base station, a media player, a navigation device, an email device, a game console, or a combination of any two or more of these data processing devices or other data processing devices. In some implementations, device 101 shown in FIG. 1B is an example of how device 100 can be configured to display a different set of objects. In some implementations, device 101 has a different set of device functionalities than device 100 shown in FIG. 1A, but otherwise operates in a similar manner to device 100.

Mobile Device Overview

In some implementations, the mobile device 101 includes a touch-sensitive display 102, which can be sensitive to haptic and/or tactile contact with a user. In some implementations, the mobile device 101 can display one or more graphical user interfaces on the touch-sensitive display 102 for providing the user access to various system objects and for conveying information to the user.

Mobile Device Functionality

In some implementations, the mobile device 101 can implement multiple device functionalities, such as a music processing device, as indicated by the music player object 124, a video processing device, as indicated by the video player object 125, a digital photo album device, as indicated by the photos object 134, and a network data communication device for online shopping, as indicated by the store object 126. In some implementations, particular display objects 104, e.g., the music player object 124, the video player object 125, the photos object 134, and store object 126, can be displayed in a menu bar 118. In some implementations, device functionalities can be accessed from a top-level graphical user interface, such as the graphical user interface illustrated in FIG. 1B. Touching one of the objects 124, 125, 134, or 126 can, for example, invoke corresponding functionality.

In some implementations, the top-level graphical user interface of mobile device 101 can include additional display objects 106, such as the Web object 114, the calendar object 132, the address book object 150, the clock object 148, the calculator object 138, and the settings object 152 described above with reference to mobile device 100 of FIG. 1A. In some implementations, the top-level graphical user interface can include other display objects, such as a Web video object 123 that provides functionality for uploading and playing videos on the Web. Each selection of a display object 114, 123, 132, 150, 148, 138, and 152 can invoke a corresponding object environment and functionality.

Additional and/or different display objects can also be displayed in the graphical user interface of FIG. 1B. In some implementations, the display objects 106 can be configured by a user. In some implementations, upon invocation of device functionality, the graphical user interface of the mobile device 101 changes, or is augmented or replaced with another user interface or user interface elements, to facilitate user access to particular functions associated with the corresponding device functionality.

In some implementations, the mobile device 101 can include one or more input/output (I/O) devices 160, 162, 164, and 166, a volume control device 184, sensor devices 168, 170, 172, and 180, wireless communication subsystems 186 and 188, and a port device 190 or some other wired port connection described above with reference to mobile device 100 of FIG. 1A.

Network Operating Environment

Figure 2:
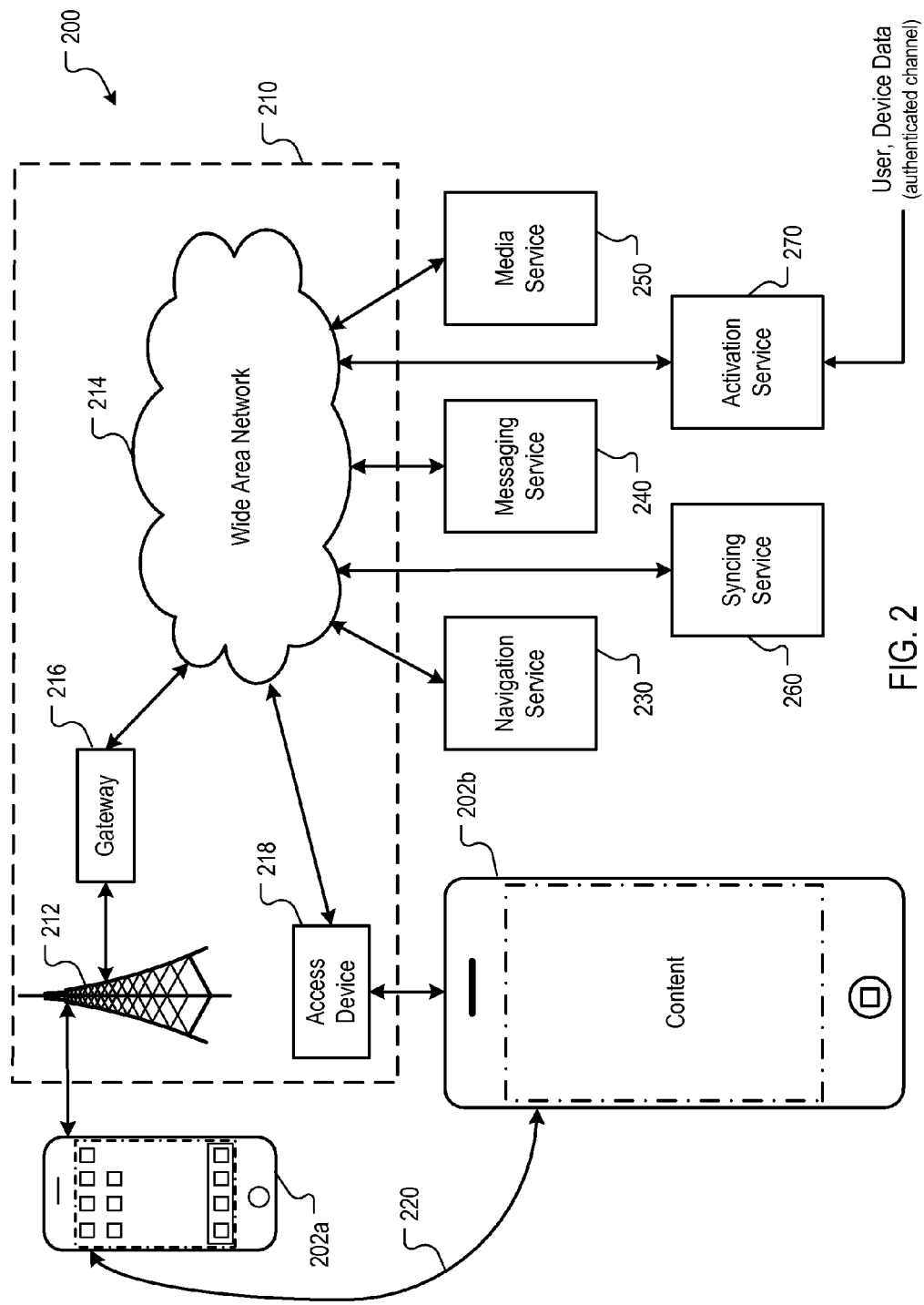
FIG. 2 is a block diagram of an example network operating environment for the mobile devices of FIGS. 1A-1B.

FIG. 2 is a block diagram of an example network operating environment 200. In FIG. 2, mobile devices 202a and 202b each can represent mobile device 100 or 101. Mobile devices 202a and 202b can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access device 218, such as an 802.11g wireless access device, can provide communication access to the wide area network 214. In some implementations, both voice and data communications can be established over the wireless network 212 and the access device 218. For example, the mobile device 202a can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, in some implementations, the mobile device 202b can place and receive phone calls, send and receive e-mail messages, and retrieve electronic documents over the access device 218 and the wide area network 214. In some implementations, the mobile device 202a or 202b can be physically connected to the access device 218 using one or more cables and the access device 218 can be a personal computer. In this configuration, the mobile device 202a or 202b can be referred to as a "tethered" device.

The mobile devices 202a and 202b can also establish communications by other means. For example, the wireless device 202a can communicate with other wireless devices, e.g., other mobile devices 202a or 202b, cell phones, etc., over the wireless network 212. Likewise, the mobile devices 202a and 202b can establish peer-to-peer communications 220, e.g., a personal area network, by use of one or more communication subsystems, such as the Bluetooth™ communication devices 188 shown in FIGS. 1A-1B. Other communication protocols and topologies can also be implemented.

The mobile device 202a or 202b can, for example, communicate with one or more services 230, 240, 250, 260, and 270 over the one or more wired and/or wireless networks 210. For example, a navigation service 230 can provide navigation information, e.g., map information, location information, route information, and other information, to the mobile device 202a or 202b. A user of the mobile device 202b can invoke a map functionality, e.g., by pressing the maps object 144 on the top-level graphical user interface shown in FIG. 1A, and can request and receive a map for a particular location.

A messaging service 240 can, for example, provide e-mail and/or other messaging services. A media service 250 can, for example, provide access to media files, such as song files, audio books, movie files, video clips, and other media data. In some implementations, separate audio and video services (not shown) can provide access to the respective types of media files. A syncing service 260 can, for example, perform syncing services (e.g., sync files). An activation service 270 can, for example, perform an activation process for activating the mobile device 202a or 202b. Other services can also be provided, including a software update service that automatically determines whether software updates exist for software on the mobile device 202a or 202b, then downloads the software updates to the mobile device 202a or 202b where the software updates can be manually or automatically unpacked and/or installed.

The mobile device 202a or 202b can also access other data and content over the one or more wired and/or wireless networks 210. For example, content publishers, such as news sites, RSS feeds, web sites, blogs, social networking sites, developer networks, etc., can be accessed by the mobile device 202a or 202b. Such access can be provided by invocation of a web browsing function or application (e.g., a browser) in response to a user touching the Web object 114.

Example Mobile Device Architecture

Figure 3:
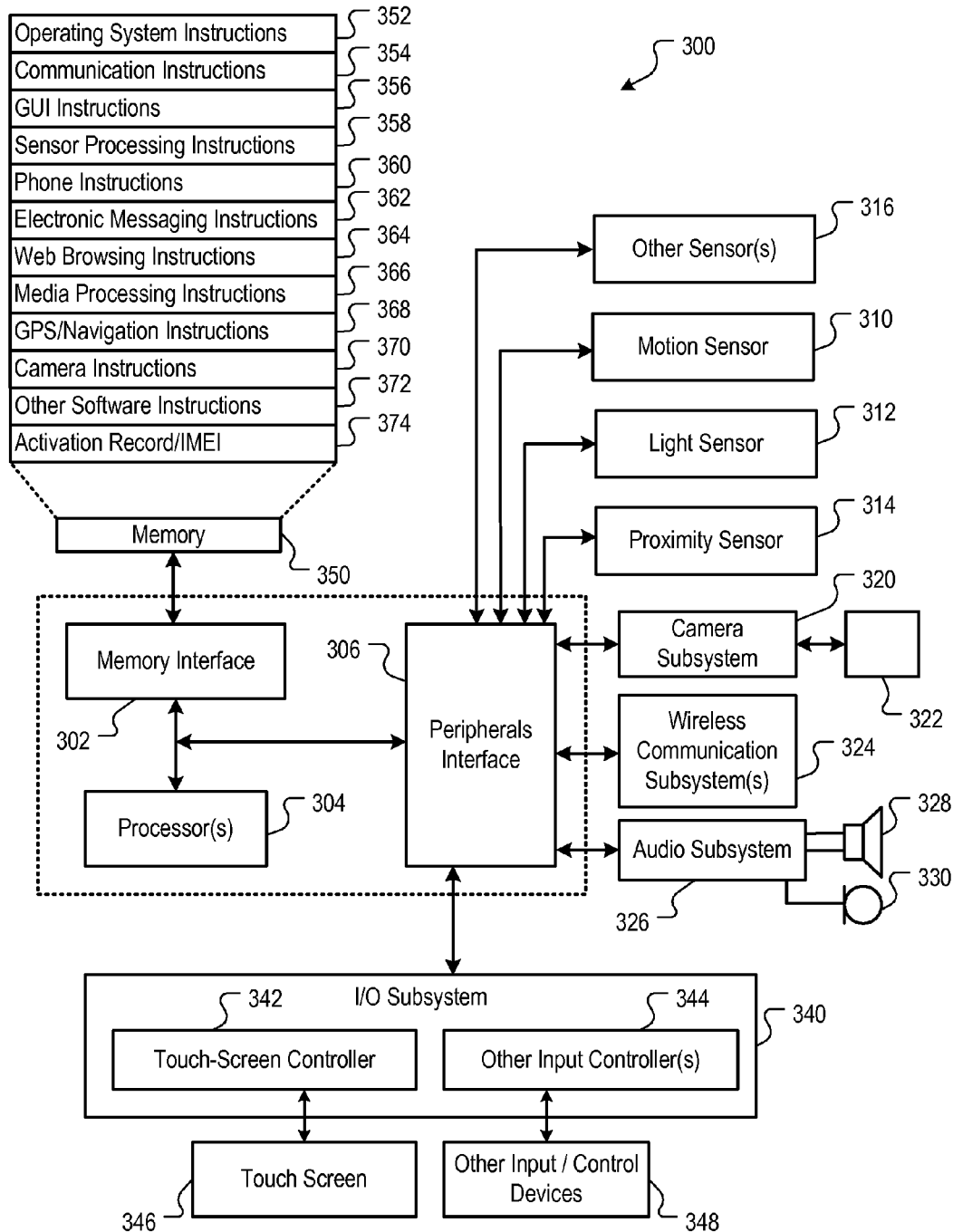
FIG. 3 is a block diagram of an example implementation of the mobile devices of FIGS. 1A-1B.

FIG. 3 is a block diagram 300 of an example implementation of the mobile devices 100 and 101 of FIGS. 1A-1B, respectively. The mobile device 100 or 101 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 or 101 can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting, and proximity functions described with respect to FIG. 1A. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 or 101 is intended to operate. For example, a mobile device 100 or 101 may include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the device 100 or 101 may be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 or 101 on or off. The user may be able to customize a functionality of one or more of the buttons. The touch screen 346 can, for example, also be used to implement virtual or soft buttons and/or a keyboard.

In some implementations, the mobile device 100 or 101 can present recorded audio and/or video files, such as MP3, AAC, and MPEG files. In some implementations, the mobile device 100 or 101 can include the functionality of an MP3 player, such as an iPod™. The mobile device 100 or 101 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel), as described in reference to FIGS. 4A and 4B.

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions, e.g., security processes and functions as described in reference to FIGS. 4A and 4B. The memory 350 may also store other software instructions (not shown), such as web video instructions to facilitate web video-related processes and functions; and/or web shopping instructions to facilitate web shopping-related processes and functions. In some implementations, the media processing instructions 366 are divided into audio processing instructions and video processing instructions to facilitate audio processing-related processes and functions and video processing-related processes and functions, respectively. An activation record and International Mobile Equipment Identity (IMEI) 374 or similar hardware identifier can also be stored in memory 350.

Each of the above identified instructions and applications can correspond to a set of instructions for performing one or more functions described above. These instructions need not be implemented as separate software programs, procedures, or modules. The memory 350 can include additional instructions or fewer instructions. Furthermore, various functions of the mobile device 100 or 101 may be implemented in hardware and/or in software, including in one or more signal processing and/or application specific integrated circuits.

Software Stack and Security Process

Figure 4A:
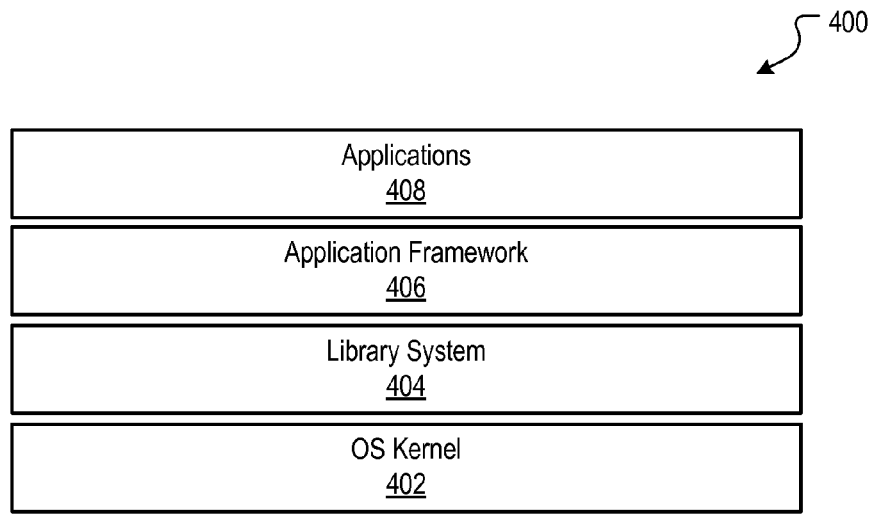
FIG. 4A illustrates an example implementation of a software stack for the mobile devices of FIGS. 1A-1B.

FIG. 4A illustrates an example implementation of a software stack 400 for the mobile devices of FIGS. 1A-1B. In some implementations, the software stack 400 includes an operating system (OS) kernel 402 (e.g., a UNIX kernel), a library system 404, an application framework 406, and an applications layer 408.

The OS kernel 402 manages the resources of the mobile device 100 or 101 and allows other programs to run and use these resources. Some examples of resources include a processor, memory, and I/O. For example, the kernel 402 can determine which running processes should be allocated to a processor, processors or processor cores, allocates memory to the processes and allocates requests from applications and remote services to perform I/O operations. In some implementations, the kernel 402 provides methods for synchronization and inter-process communications with other devices.

In some implementations, the kernel 402 can be stored in non-volatile memory of the mobile device 100 or 101. When the mobile device 100 or 101 is turned on, a boot loader starts executing the kernel 102 in supervisor mode. The kernel then initializes itself and starts one or more processes for the mobile device 100 or 101, including a security process 410 for remote access management, as described in reference to FIG. 4B.

The library system 404 provides various services for applications running in the application layer 408. Such services can include audio services, video services, database services, image processing services, graphics services, etc.

The application framework 406 provides an object-oriented application environment including classes and Application Programming Interfaces (APIs) that can be used by developers to build applications using well-known programming languages (e.g., Objective-C, Java).

The applications layer 408 is where various applications exist in the software stack 400. Developers can use the APIs and environment provided by the application framework 406 to build applications, such as the applications represented by the display objects 104, 106, shown in FIGS. 1A-1B (e.g., email, media player, Web browser, phone, music player, video player, photos, and store).

Secure Communication Channel

Figure 4B:
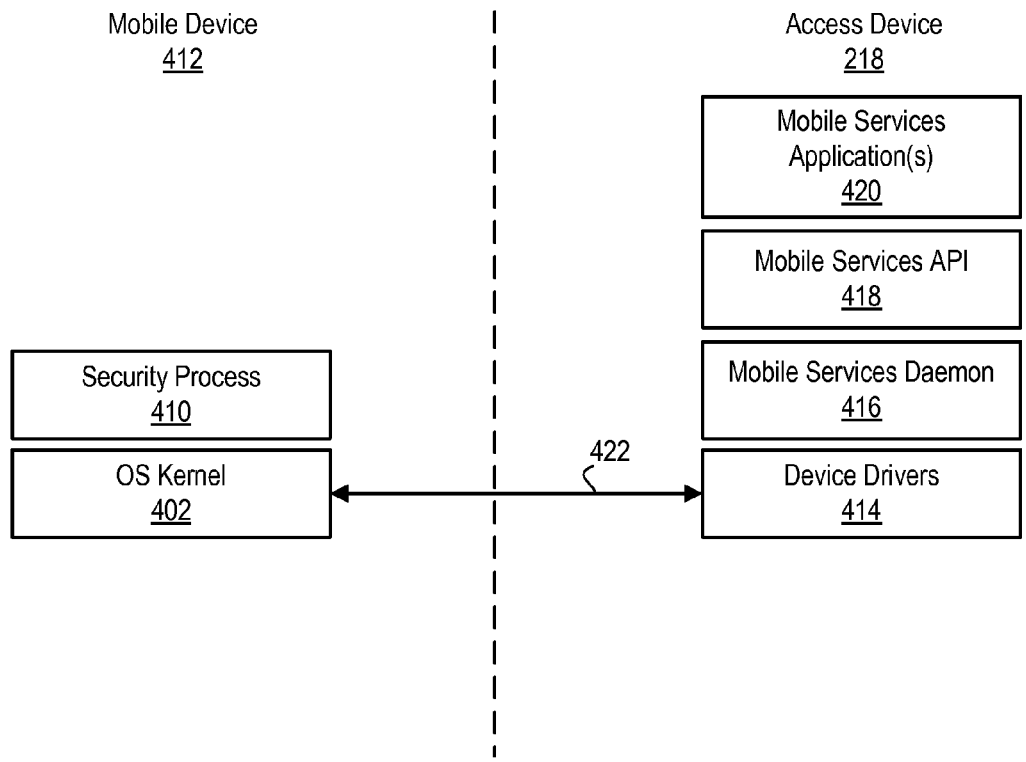
FIG. 4B illustrates an example implementation of a security process for remote access management over a secure communications channel.

FIG. 4B illustrates an example implementation of a security process 410 for remote access management over a secure communications channel 422. In the example shown, the mobile device 412, e.g., mobile device 100 or 101, is running the security process 410, which communicates with the OS kernel 402. Any remote access requests made to the kernel 402 are intercepted by the security process 410, which is responsible for setting up secure communication sessions between the mobile device 412 and a mobile services access device 218. In some implementations, the process 410 uses a cryptographic protocol, such as Secure Sockets Layer (SSL) or Transport Layer Security (TLS) to provide secure communications between the mobile device 412 and the access device 218. The access device 218 can be any device with network connectivity, including but not limited to: a personal computer, a hub, an Ethernet card, another mobile device, a wireless base station, etc. The secure communications channel can be a Universal Serial Bus (USB), Ethernet, a wireless link (e.g., Wi-Fi, WiMax, 3G), an optical link, infrared link, FireWire™, or any other known communications channel or media.

In the example shown, the access device 218 includes device drivers 414, a mobile services daemon 416, a mobile services API 418, and one or more mobile service applications 420. The device drivers 414 are responsible for implementing the transport layer protocol, such as TCP/IP over USB. The mobile services daemon 416 listens (e.g., continuously) to the communications channel 422 for activity and manages the transmission of commands and data over the communication channel 422. The mobile services API 418 provides a set of functions, procedures, variables, and data structures for supporting requests for services made by the mobile services application 420. The mobile services application 420 can be a client program running on the access device 218, which provides one or more user interfaces for allowing a user to interact with a remote service (e.g., activation service 270) over a network (e.g., the Internet, wireless network, peer-to-peer network, optical network, Ethernet, intranet). In some implementations, a device activation process can be used, as described in co-pending U.S. patent application Ser. No. 11/767,447, filed Jun. 22, 2007, for "Device Activation and Access," which patent application is incorporated by reference herein in its entirety. The application 420 can allow a user to set preferences, download or update files of content or software, search databases, store user data, select services, browse content, perform financial transactions, or engage in any other online service or function. An example of a mobile services application 420 is the iTunes™ client, which is publicly available from Apple Inc. (Cupertino, Calif.). An example of a mobile device 412 that uses the iTunes™ client is the iPod™ product developed by Apple Inc. Another example of a mobile device 412 that uses the iTunes™ client is the iPhone™ product developed by Apple Inc.

In an example operational mode, a user connects the mobile device 412 to the access device 218 using, for example, a USB cable. In other implementations, the mobile device 412 and access device 218 include wireless transceivers for establishing a wireless link (e.g., Wi-Fi). The drivers 414 and kernel 402 detect the connection and alert the security process 410 and mobile services daemon 416 of the connection status. Once the connection is established, certain non-sensitive information can be passed from the mobile device 412 to the access device 218 (e.g., name, disk size, activation state) to assist in establishing a secure communication session.

In some implementations, the security process 410 establishes a secure communication session (e.g., encrypted SSL session) with the access device 218 by implementing a secure network protocol. For example, if using SSL protocol, the mobile device 412 and access device 218 will negotiate a cipher suite to be used during data transfer, establish and share a session key, and authenticate the access device 218 to the mobile device 412. In some implementations, if the mobile device 412 is password protected, the security process 410 will not establish a session, and optionally alert the user of the reason for failure.

Once a secure session is successfully established, the mobile device 412 and the access device 218 can exchange sensitive information (e.g., passwords, personal information), and remote access to the mobile device 412 can be granted to one or more services (e.g., navigation service 230, messaging service 240, media service 250, syncing service 260, activation service 270). In some implementations, the mobile services daemon 416 multiplexes commands and data for transmission over the communication channel 422. This multiplexing allows several remote services to have access to the mobile device 412 in a single session without the need to start a new session (or handshaking) for each service requesting access to the mobile device 412.

Example Scenarios for Carrier Configuration at Activation

Figure 5:
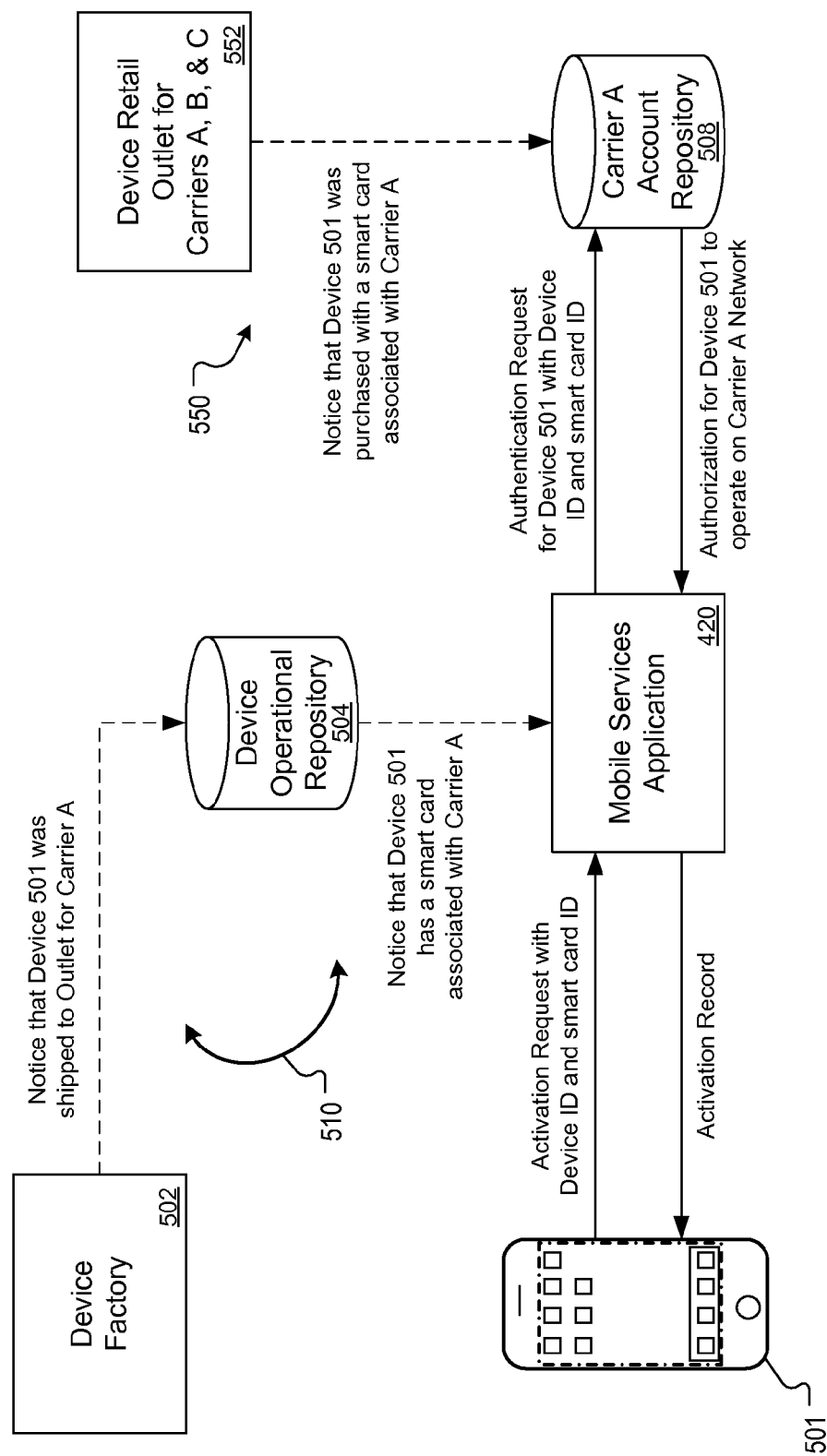
FIG. 5 illustrates two example scenarios for carrier configuration at activation for a mobile device.

FIG. 5 illustrates two example scenarios 510 and 550 for carrier configuration at activation for a mobile device (e.g., the mobile devices 100 and 101 of FIGS. 1A-1B, respectively). The mobile device 501 includes generic software which allows the mobile device 501 to self-configure for a particular telecommunications carrier, e.g., Carrier A, at the time the mobile device 501 is activated.

The mobile device 501 and possibly other similar mobile devices are manufactured at device factory 502. Unlike conventional mobile devices, the mobile device 501 is not manufactured with carrier-specific software. Configuration of generic software on the mobile device 501 for any of a number of telecommunications carriers can be postponed to a point after the mobile device 501 has been manufactured. For example, if Carriers A, B, and C can be supported by the mobile device 501, the mobile device 501 produced by the device factory 502 will have generic software which can be configured for Carrier A, Carrier B, or Carrier C when the mobile device 501 is activated, as will be described in more detail below.

In some implementations, if Carriers A, B, and C will be supported, the generic software can include a set of carrier-specific settings or default values for each of Carriers A, B, and C. In some implementations, the generic software does not include carrier-specific settings for any telecommunications carrier. In this implementation, when a user purchases the mobile device 501, carrier-specific settings for a particular telecommunications carrier selected by the user can be provided to/accessed by the mobile device 501 upon activation.

In some implementations, the mobile device 501 is manufactured with carrier-specific hardware. Communications hardware components (e.g., components in wireless communication subsystem 324 of FIG. 3) in a mobile device can be provisioned to only work with memory devices (e.g., smart cards) or integrated circuit cards (ICC) associated with a particular telecommunications carrier. Generally, memory devices (hereinafter referred to generically as "smartcards") can be used to allow users to change mobile devices. A smart card can include personal as well as system configuration information. Removing the smart card from one mobile device and inserting the smart card into another mobile device allows a user to easily change mobile devices. As described above, some smart cards can store carrier specific information used to authenticate and identify subscribers on the carrier network. Examples of a smart card for the mobile device 501 can include a Subscriber Identity Module (SIM), a Universal Integrated Circuit Card (UICC), and a Removable User Identity Module (RUIM). A smart card for mobile devices can have a serial number (e.g., an International Circuit Card ID (ICCID), an International Mobile Subscriber Identity (IMSI), an Authentication Key (Ki), or a Local Area Identity (LAI)) which uniquely identifies the smart card. Typically, the unique serial number can also identify a particular telecommunications carrier associated with the smart card. In one example, radio boards in conventional mobile devices are provisioned to only operate with SIM cards with an ICCID that identifies a particular telecommunications carrier. In effect, a radio board can be "locked" to a particular telecommunications carrier.

In some implementations, the mobile device 501 is manufactured with generic hardware. That is, communications hardware components (e.g., components in wireless communication subsystem 324 of FIG. 3) in the mobile device can be manufactured to work with a smart card or ICC associated with any of a number of telecommunications carriers. For example, a radio board in the mobile device 501 can be provisioned to operate with SIM cards with an ICCID that is associated with any of the telecommunications carriers supported by the mobile device 501. In some implementations, the radio board in the mobile device 501 can be manufactured to operate with any smart card for a given communication protocol, regardless of the particular telecommunications carrier associated with the smart card.

In the first example scenario 510, the mobile device 501 is manufactured in device factory 502 and shipped for consumer sale to a retail outlet for Carrier A. A notice that the mobile device 501 was shipped to a Carrier A outlet is sent to a device operational repository 504. The device operational repository 504 can be, for example, a database that stores information about the mobile device 501 and other devices. In some implementations, the information associated with the mobile device 501 can be indexed in the device operational repository 504 by an identifier for the mobile device 501. For example, the mobile device 501 can be uniquely identified by a serial number or an identifier, e.g., an IMEI 374 stored in the device memory 350 in FIG. 3. A unique identifier for the mobile device 501, which can be included in the notice from the device factory 502, can be further included in a message concerning the mobile device 501 sent from the device operational repository 504.

Typically, when a device is shipped for consumer sale to an outlet for a particular telecommunications carrier, the carrier will only offer to sell the device for use on the particular carrier's telecommunications network. For example, a user who purchases the mobile device 501 at the Carrier A outlet will generally receive a smart card associated with Carrier A for use with the mobile device 501. Consequently, the device operational repository 504 can store information that associates the mobile device 501 with a smart card (or the particular smart card) associated with Carrier A. This information can be used to determine the carrier-specific capabilities (e.g., wireless network service within range of certain wireless access points) of the mobile device 501 and on which network (e.g., the Carrier A network) the mobile device 501 will operate.

The device operational repository 504 can forward information associated with the mobile device 501 to a mobile services application 420. In the first example scenario 510, the device operational repository 504 sends a notice to the mobile services application 420 indicating that the mobile device 501 has installed a removable smart card that is associated with Carrier A. The notice can include, for example, an identifier for the mobile device 501 (e.g., an IMEI) and an identifier for the smart card (e.g., an ICCID).

In the first example scenario 510, after the user purchases the mobile device 501 from the Carrier A outlet and the smart card associated with Carrier A is installed in the mobile device 501, the user can activate the mobile device 501 by, for example, connecting the mobile device 501 to an access device (e.g., access device 218 of FIGS. 2 and 4B) to access a mobile services application 420. The mobile device 501 can be connected (e.g., tethered) to an access device by a physical connection (e.g., a cable connected to USB ports) or through a wireless link (e.g., Wi-Fi). In some implementations, after a secure session (e.g., an SSL session) is established between the mobile device 501 and the access device (e.g., a personal computer), the mobile services application 420 (e.g., the iTunes™ client) is automatically invoked and directs the user to an activation service (e.g., activation service 270 of FIG. 2) for the mobile device 501. Early in the activation process, the mobile device 501 can send (e.g., automatically) an activation request to the mobile services application 420. In some implementations, the activation request includes both a unique identifier (e.g., an IMEI) for the mobile device 501 and a unique identifier (e.g., an ICCID) for the installed smart card.

In some implementations, the user is required to create an account through the mobile services application 420 before the user is provided with one or more remote services provided by one or more remote service providers (e.g., carrier services, content portals, or websites). After a user account is established through the mobile services application 420, the user can create one or more accounts with the individual remote service providers (e.g., Carrier A).

The mobile services application 420 sends an authentication request for mobile device 501 to an activation service that includes Carrier A account repository 508. The authentication request can include information received from the mobile device 501 in the activation request. For example, the authentication request can include the unique identifier for the mobile device 501 and the unique identifier for the smart card. In some implementations, the authentication request includes further information, e.g., information received from the device operational repository 504.

In some implementations, the activation service maintains a relational database or registry (e.g., MySQL™) of user information, ICCIDs, IMEI, and any other information needed to authenticate a user and to provide activation services. In some implementations, Carrier A account repository 508 is part of this activation service database or registry. Using the database or registry, the activation service knows, for example, that a particular mobile device (e.g., mobile device 501) with a particular IMEI, with a particular SIM card was purchased by a particular user on a particular date, and that a particular carrier (e.g., Carrier A) is providing one or more services to the user, and the activation date of those services.

In some implementations, the foregoing information known by the activation service can be compared with the information received in the authentication request from the mobile services application 420, for purposes of authenticating the user to ensure that the user requesting the activation service is the true owner of the mobile device 501 and/or an authorized subscriber of Carrier A's telecommunications services.

If the information included in the authentication request matches the information associated with the mobile device 501 in the Carrier A Account Repository 508, the activation service can transmit an authorization for device 501 to the mobile services application 420. The authorization can allow the user access to one or more telecommunications services using the Carrier A network.

The activation service can generate an activation record specific to the mobile device 501, which can be sent to the mobile device 501 from the mobile services application 420. In some implementations, the activation record can include the unique identifiers for the mobile device 501 and the smart card. The activation record can be used by the mobile device 501 to complete the activation process, for example, by verifying that the identifiers in the activation record match the identifiers for the mobile device 501 and the installed smart card.

During the activation process, information regarding the carrier is exchanged between the mobile device 501 and the mobile services application 420, and the mobile device 501 is configured accordingly. For example, the mobile device 501 can receive data from the mobile services application 420 that specifies how generic software stored therein should be configured for the particular telecommunications carrier associated with the smart card. The received data can specify that the set of carrier-specific settings or default values associated with the particular telecommunications carrier (e.g., Carrier A) should be enabled, while the sets of carrier-specific settings or default values for all other supported telecommunications carriers should be disabled.

In some implementations, if the carrier-specific settings are later cleared from the mobile device 501 (e.g., the mobile device 501 is deactivated and device functionality is locked), the user can re-activate the mobile device 501 by, for example, repeating the activation process in the same general manner as described above. The mobile services application 420 or the activation service can recognize that the mobile device 501 has already been activated with the same smart card (e.g., by verifying the IMEI and the ICCID with information in the relational database). In some implementations, when the identifiers are verified, the mobile services application 420 can send the mobile device 501 data (e.g., the set of carrier-specific settings) to enable the mobile device 501 to self-configure, for a second time, for the particular telecommunications carrier.

In some implementations, one or more carrier-specific settings are sent to the mobile device 501 during or just after activation. These carrier-specific settings can be pushed from the mobile services application 420 to the mobile device 501 or pulled by the mobile device 501 using the wired and/or wireless networks 210 (FIG. 2). For example, if the generic software on the mobile device 501 includes a set of carrier-specific settings for each of Carriers A, B, and C, and the user installs a smart card associated with Carrier D, the set of carrier-specific settings for Carrier D can be sent to the mobile device 501 during activation. The generic software on the mobile device 501 can then self-configure for Carrier D, for example, by enabling the received set of Carrier D-specific settings and disabling the sets of settings specific to Carriers A, B, and C.

In some implementations, when the radio board is not provisioned for a particular telecommunications carrier when the mobile device 501 is manufactured, the radio board is configured at activation for the telecommunications carrier associated with the smart card installed in the mobile device 501. For example, the radio board can be provisioned at activation to only work with the smart card (e.g., as identified by an ICCID) presently installed in the mobile device 501. In effect, this provides a lock on the radio board and, consequently, a lock on the mobile device 501 until the mobile device 501 is re-activated with a different smart card, as described in more detail below.

In the second example scenario 550, the mobile device 501 is manufactured in the device factory 502 and shipped for consumer sale to a device retail outlet for Carriers A, B, and C 552. Unlike the Carrier A outlet of example scenario 510, the device retail outlet for Carriers A, B, and C 552 might offer to sell the mobile device 501 for use on any of Carrier A's network, Carrier B's network, and Carrier C's network. In the present example, the user of the mobile device 501 purchases the mobile device 501 for use on Carrier A's network, e.g., by purchasing the mobile device 501 with a smart card associated with Carrier A. In another scenario, the user purchases the mobile device 501 with a smart card associated with a different telecommunications carrier (e.g., Carrier B or Carrier C), and the mobile device 501 is later configured at activation for the chosen carrier.

A notice that the mobile device 501 was purchased with a smart card associated with Carrier A is sent from the device retail outlet for Carriers A, B, and C 552 to the Carrier A Account Repository 508. In some implementations, a unique identifier (e.g., an IMEI) for the mobile device 501 and a unique identifier (e.g., an ICCID) for the smart card can be included in the notice from the device retail outlet for Carriers A, B, and C 552.

After the user purchases the mobile device 501 from the device retail outlet for Carriers A, B, and C 552 and the smart card associated with Carrier A is installed in the mobile device 501, the user can activate the mobile device 501 in the second example scenario 550 in the same general manner as described above with respect to the first example scenario 510.

Carrier-Specific Settings for Configuration

Configuration of the mobile device 501 using the carrier-specific settings can include configuring a number of telecommunications applications. For example, if Carrier A will provide voicemail, e-mail, or other data services to the mobile device 501 (e.g., using EDGE or GPRS communications protocol), the applications residing on the mobile device 501 to support these services will be configured at activation using the carrier-specific settings.

Different telecommunications carriers may have one or more different wireless access points providing wireless network access (e.g., Wi-Fi) in certain locations, e.g., airports, public buildings, hotels, restaurants, and retail outlets. In some implementations, the mobile device 501 can be configured using the carrier-specific settings to automatically connect to a network when the mobile device 501 is within the coverage range of these wireless access points. Some telecommunications carriers vary the services supported or features of supported services depending on where (e.g., a home zone) a mobile device 501 is presently located. In some implementations, the mobile device 501 can be configured using the carrier-specific settings to automatically enable zone-specific features or services when the mobile device 501 is located in a particular zone.

In some implementations, carrier-specific settings are used to configure the way a mobile device 501 displays carrier account information to the user. For example, subscriber account information (e.g., account bill balance, number of minutes remaining, etc.) can be accessed by navigating one or more menus (e.g., for settings, phone, carrier service, etc.) on the mobile device 501. The presentation of account information can vary based on the telecommunications carrier and the specific set of supported services purchased by the user. In some implementations, one or more of the carrier-specific settings can be manually modified by the user, for example, by changing preference settings or navigating the one or more menus to access the subscriber account information on the mobile device 501.

In some implementations, configuration of the mobile device 501 includes using the carrier-specific settings to configure certain settings or defaults for other applications on the mobile device 501. In one example, carrier-specific configuration can include setting one or more bookmarks (e.g., for the telecommunications carrier's main web page) for the web browsing application, accessible by selection of the Web object 114 (FIGS. 1A-1B). In another example, one or more default stocks (e.g., the telecommunications carrier's stock) can be configured for display when the user accesses a stock quote application, for example, by selecting the stocks object 140 (FIG. 1A). In a third example, a default home page (e.g., the telecommunications carrier's services web page) can be configured for display when the user accesses an online shopping application, for example, by selecting the store object 126 (FIG. 1B).

In some implementations, the carrier-specific settings can include settings specific to the country or region in which the mobile device 501 will be operated. For example, different countries may support service for TDD/TTY (Telecommunications Device for the Deaf/teletypewriter) using different TTY protocols. In another example, different countries may have different limits on the volume level of audio output from a speaker of a mobile telephony device. In some implementations, when the mobile device 501 is configured at activation, the mobile device 501 is automatically configured with country-specific or region-specific settings, which are included in the carrier-specific settings. In some implementations, in addition to software configuration control as described above, hardware configuration (e.g., radio power levels, audio output levels, etc.) can also be controlled at activation.

Example Carrier Determination Process

Figure 6:
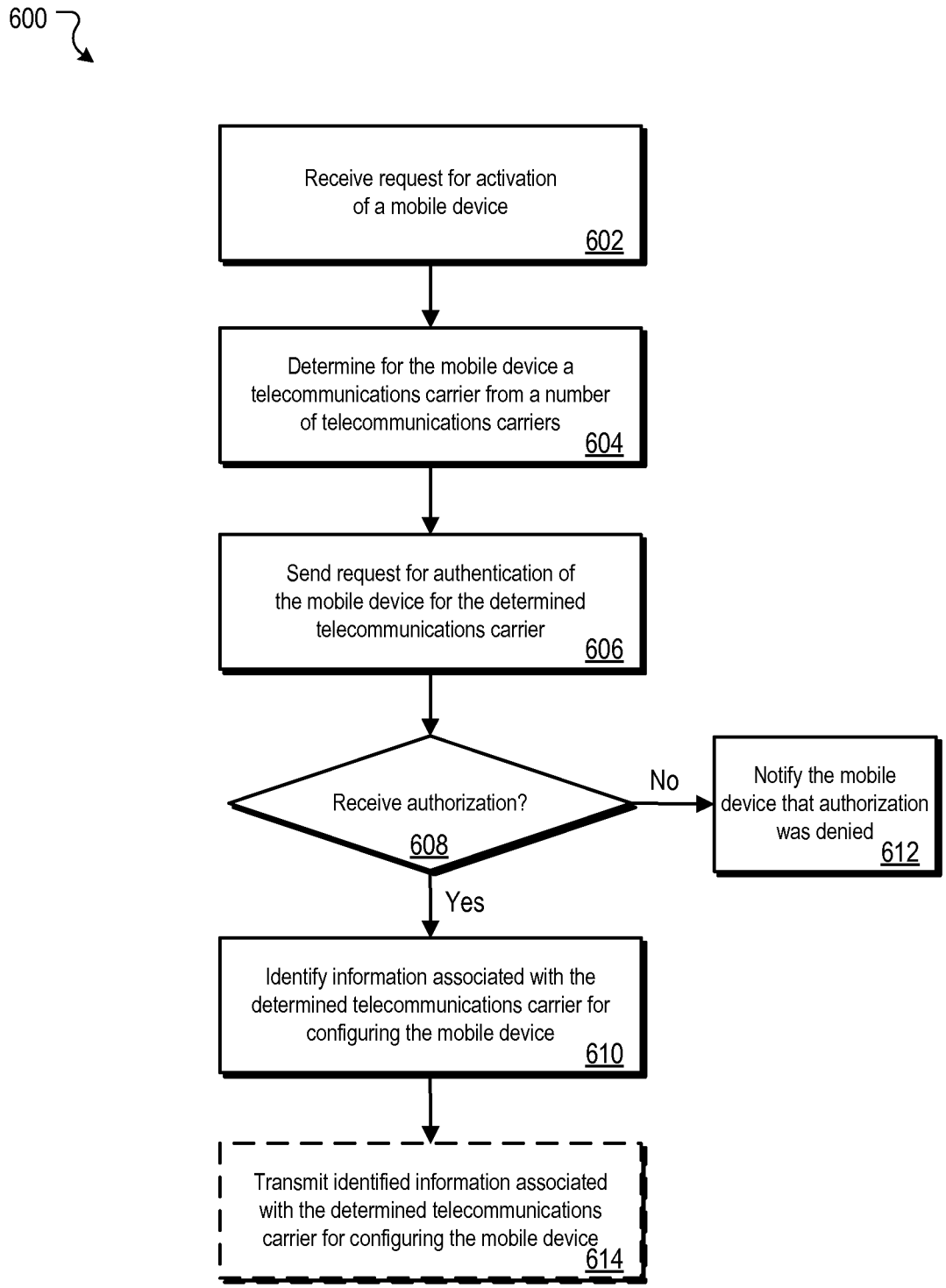
FIG. 6 is a flow diagram of an example carrier determination process for an access device.

FIG. 6 is a flow diagram of an example carrier determination process 600 for an access device. The process 600 begins when the access device receives a request for activation of a mobile device (602). For example, the access device 218 of FIG. 4B can receive the activation request from mobile device 412 of FIG. 4B through a physical connection (e.g., a cable) or through a wireless link.

During the activation process for the mobile device, the access device can determine for the mobile device a telecommunications carrier from a number of telecommunications carriers (604). For example, if the mobile device 501 (FIG. 5) was purchased from a device retail outlet for Carriers A, B, & C 552 (FIG. 5), the access device can determine that the mobile device 501 will operate on telecommunications Carrier A's network, for example, based on the smart card received by the user for use with the mobile device 501.

A request is sent for authentication of the mobile device for use on the network of the determined telecommunications carrier (606). In some implementations, the request is sent from a mobile services application 420 (FIGS. 4B and 5) running on the access device. The authentication request can be sent to an activation service or to the determined telecommunications carrier. In some implementations, the activation service receiving the authentication request is specific to the determined telecommunications carrier. In other implementations, the activation service receiving the authentication request is a generic activation service for multiple telecommunications carriers.

During activation of the mobile device, if authorization is not received for the mobile device to operate on the determined telecommunications carrier's network ("No" branch of decision 608), the mobile device can be notified that the authorization was denied (612). In some implementations, the carrier determination process 600 can then be terminated and/or other action can be taken (e.g., automatically restarting the process 600).

During activation of the mobile device, if authorization is received for the mobile device to operate on the determined telecommunications carrier's network ("Yes" branch of decision 608), the process 600 can continue with the identification of information associated with the determined telecommunications carrier for configuring the mobile device (610). In some implementations, the identified information indicates that the set of carrier-specific settings for the determined telecommunications carrier should be enabled and/or the sets of settings specific to other telecommunications carriers should be disabled. In other implementations, the identified information includes carrier-specific settings or default values for the determined telecommunications carrier. In some implementations, the identified information associated with the determined telecommunications carrier is transmitted to the mobile device for configuring the mobile device (614).

Example Carrier Configuration Process

Figure 7:
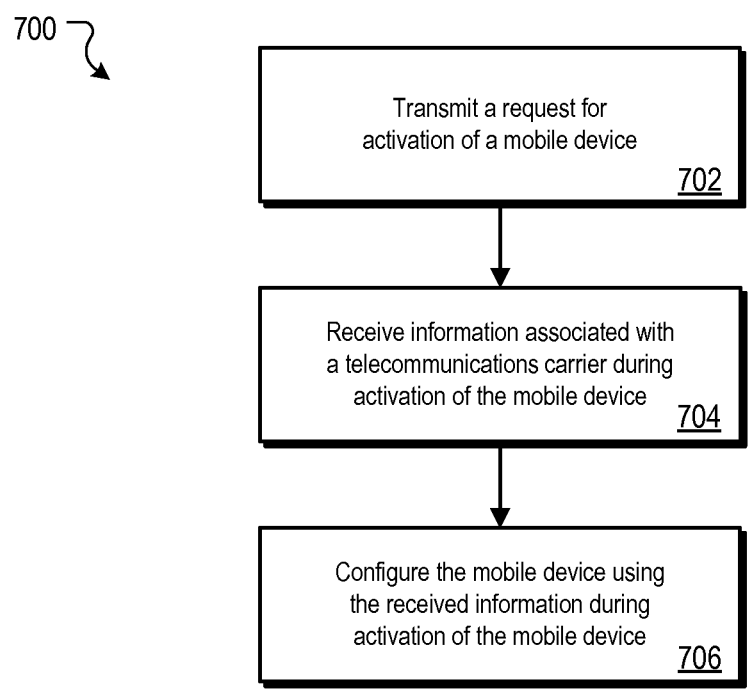
FIG. 7 is a flow diagram of an example carrier configuration process for a mobile device.

FIG. 7 is a flow diagram of an example carrier configuration process 700 for a mobile device (e.g., the mobile devices 100 and 101 of FIGS. 1A-1B, respectively). The process 700 begins when the mobile device transmits a request for activation of the mobile device (702). For example, the activation request can be sent from the mobile device 412 (FIG. 4B) to the access device 218 (FIG. 4B) through a physical connection or a wireless link. In some implementations, the activation request includes a unique identifier (e.g., an IMEI) for the mobile device and a unique identifier (e.g., an ICCID) for a removable smart card installed in the mobile device.

During the activation process for the mobile device, the mobile device can receive information associated with a telecommunications carrier (704). In some implementations, the received information indicates which set of carrier-specific settings existing on the mobile device should be enabled and/or which sets should be disabled. In other implementations, the transmitted information includes carrier-specific settings or default values for the particular telecommunications carrier that will provide one or more services to the mobile device.

During the activation process for the mobile device, the mobile device can use the received information to self-configure (706). In some implementations, configuring the mobile device includes configuring a software stack (e.g., software stack 400 of FIG. 4A) of the mobile device. In some implementations, configuring the mobile device includes configuring a radio board or other hardware components in the mobile device. In some implementations, the self-configuring mobile device is a personal digital assistant, a cellular telephone, a smart phone, an EGPRS mobile phone, or a media player. In some implementations, the self-configuring mobile device includes a multi-touch-sensitive display.

Example Carrier Determination Process

Figure 8:
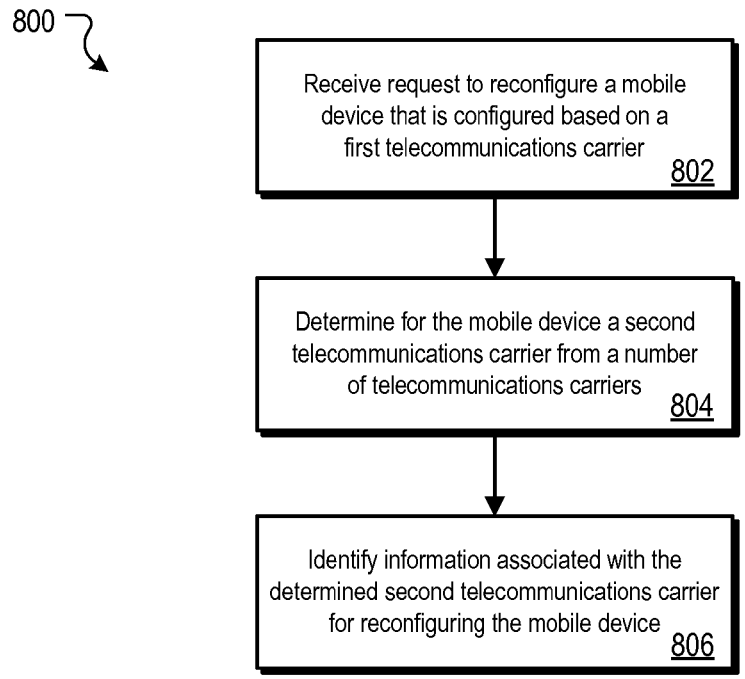
FIG. 8 is a flow diagram of an example carrier determination process for an access device.

FIG. 8 is a flow diagram of an example carrier determination process 800 for an access device. The process 800 begins when the access device receives a request to (re-)configure a mobile device that is presently configured based on a first telecommunications carrier (802). For example, the request can be received from a mobile device which has already been activated and configured for use on a first telecommunications carrier's network. In some implementations, the reconfiguration request includes a unique identifier for the mobile device and a unique identifier for the smart card.

In some implementations, the request to reconfigure a mobile device can occur as part of re-activation or a repeated activation process for the mobile device. For example, if the mobile device has been activated and configured with a first smart card (e.g., with a first unique smart card identifier), if the user removes the first smart card from the mobile device and replaces it with a second smart card (e.g., with a second unique smart card identifier), a security process (e.g., security process 410 of the mobile device 412 of FIG. 4B) can detect the change in the installed smart card and can initiate an action, such as starting a new activation process.

In some scenarios, the first smart card associated with the first telecommunications carrier is replaced with a second smart card associated with the first telecommunications carrier. For example, the second smart card can be owned by a second user who is borrowing the mobile device from the owner of the mobile device. In some implementations, when smart cards associated with the same carrier are switched, the mobile device software can be reconfigured with carrier-specific settings associated with the second user.

In some scenarios, the user replaces the first smart card associated with the first telecommunications carrier with a second smart card associated with a second telecommunications carrier. This "hot swapping" of smart cards may occur while the mobile device is turned on. In some implementations, when the mobile device is manufactured with generic hardware (e.g., a radio board) that is not configured specifically for a particular telecommunications carrier, the mobile device is capable of reconfiguring the hardware that was previously configured during the last activation process. That is, if the generic hardware of the mobile device was configured for the first telecommunications carrier during the first activation process, the mobile device can reconfigure the hardware for the second telecommunications carrier during a subsequent activation process, following the swapping of the smart cards.

Returning to the process 800, a second telecommunications carrier can be determined from a number of telecommunications carriers for the mobile device (804). For example, the second telecommunications carrier can be determined by identifying the telecommunications carrier associated with the replacement smart card, using the unique identifier of the replacement smart card.

Information associated with the determined second telecommunications carrier can be identified for reconfiguring the mobile device (806). In some implementations, the identified information indicates that the set of carrier-specific settings for the first telecommunications carrier should be disabled and the set of carrier-specific settings for the determined second telecommunications carrier should be enabled. In other implementations, the identified information includes carrier-specific settings or default values for the determined second telecommunications carrier. In some implementations, the identified information associated with the determined second telecommunications carrier is transmitted to the mobile device for reconfiguring the mobile device. In some implementations, the carrier determination process can be a process that is independent of the activation process.

Example Carrier Reconfiguration Process

Figure 9:
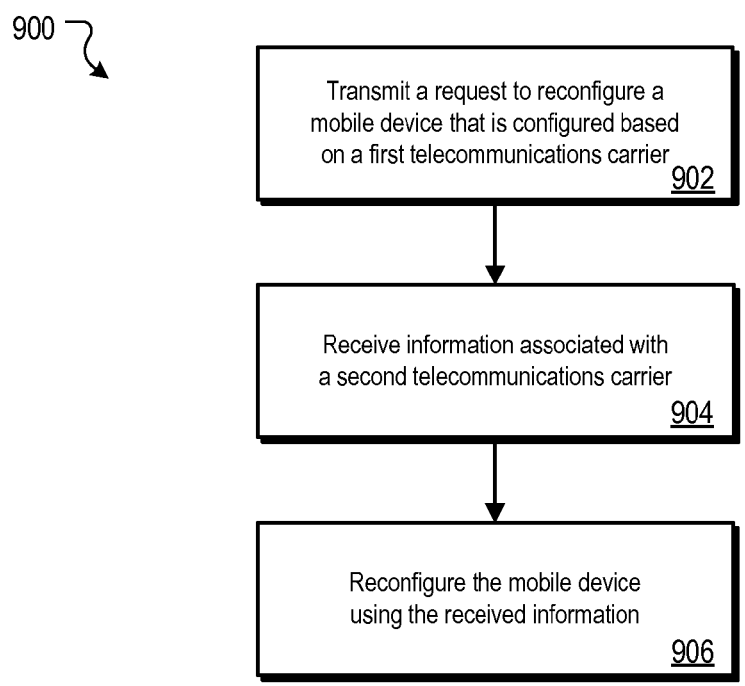
FIG. 9 is a flow diagram of an example carrier reconfiguration process for a mobile device.

FIG. 9 is a flow diagram of an example carrier reconfiguration process 900 for a mobile device (e.g., the mobile devices 100 and 101 of FIGS. 1A-1B, respectively). The process 900 begins with the transmission of a request to reconfigure a mobile device which is presently configured based on a first telecommunications carrier (902). For example, the mobile device may have been previously activated and configured for use on a first telecommunications carrier's network.

In some implementations, the request to reconfigure a mobile device can be triggered automatically when the presently installed smart card is swapped with a new smart card. A security process (e.g., security process 410 of the mobile device 412 of FIG. 4B) can detect the change in the installed smart card. In some implementations, the security process will indicate the change to a core telephony framework in the application framework (e.g., application framework 406 of the software stack 400 of FIG. 4A).

In some implementations, one or more applications (e.g., applications 408 of the software stack 400 of FIG. 4A) monitor the core telephony framework for a notice or indication that the smart card has been replaced. Upon receiving notice or detecting an indication that the smart card has been replaced, these applications can modify one or more settings (e.g., new bookmarks for a web browsing application, new stock quotes for a stock quote application) when the mobile device is reconfigured.

Returning to the process 900, information associated with a second telecommunications carrier is received (904). In some implementations, the received information indicates that the present set of active settings specific to the first telecommunications carrier should be replaced with a set of settings specific to the second telecommunications carrier. In some implementations, the received information includes one or more carrier-specific settings for the second telecommunications carrier.

The mobile device is reconfigured using the received information (906). In some implementations, reconfiguring the mobile device includes reconfiguring the software stack and/or reconfiguring the radio board or other hardware or software components in the mobile device. In some implementations, the reconfiguring mobile device is a personal digital assistant, a cellular telephone, a smart phone, an EGPRS mobile phone, or a media player. In some implementations, the reconfiguring mobile device includes a multi-touch-sensitive display.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
during activation of a mobile device, where activation includes connecting the mobile device to an access device:
receiving, at the access device, an activation request to activate the mobile device, where the activation request includes a first identifier for the mobile device and a first identifier for a smart card in the mobile device;
receiving, at the access device and from a device operational repository, information identifying a first telecommunications carrier specified for the smart card in the mobile device when the mobile device was manufactured;
sending, from the access device to a telecommunications carrier account repository for the first telecommunications carrier, an authentication request, where the authentication request includes authentication information; and
receiving, at the access device and in response to the authentication request, an authorization to activate the mobile device for the first telecommunications carrier when the authentication information matches information associated with the mobile device in the telecommunications carrier account repository for the first telecommunications carrier, where the information associated with the mobile device in the telecommunications carrier account repository is specified when the mobile device was sold to a user and includes a second identifier for the mobile device, a second identifier for the smart card, and a second telecommunications carrier.

2. The method of claim 1, where the authentication information includes the first identifier for the mobile device, the first identifier for the smart card, and the information obtained from the device operational repository.

3. The method of claim 2, where the authentication information matches the information associated with the mobile device in the telecommunications carrier account repository when the first identifier for the mobile device matches the second identifier for the mobile device, the first identifier for the smart card matches the second identifier for the smart card, and the first telecommunications carrier matches the second telecommunications carrier.

4. The method of claim 1, further comprising:
reconfiguring a software stack of the mobile device or reconfiguring one or more hardware components of the mobile device in response to receiving the authorization to activate the mobile device.

5. The method of claim 1, where the activation request is transmitted from the mobile device to the access device in response to detecting that a first smart card installed in the mobile device is replaced with a second smart card.

6. The method of claim 5, further comprising:
notifying one or more applications on the mobile device of the replacement of the first smart card with the second smart card.

7. The method of claim 5, further comprising:
reconfiguring one or more applications on the mobile device based on the received information associated with a different telecommunications carrier associated with the second smart card.

8. A system comprising:
a mobile device; and
an access device coupled to the mobile device, the access device configured to run a mobile services application comprising a user interface that enables a user of the mobile device to interact with an activation service over a network, where the access device is configured to, during activation of the mobile device:
receive an activation request to activate the mobile device, where the activation request includes a first identifier for the mobile device and a first identifier for a smart card in the mobile device;
receive, from a device operational repository, information identifying a first telecommunications carrier specified for the smart card in the mobile device when the mobile device was manufactured;
send, to a telecommunications carrier account repository for the first telecommunications carrier, an authentication request, where the authentication request includes authentication information; and
receive, in response to the authentication request, an authorization to activate the mobile device for the first telecommunications carrier when the authentication information matches information associated with the mobile device in the telecommunications carrier account repository, where the information associated with the mobile device in the telecommunications carrier account repository for the first telecommunications carrier is specified when the mobile device was sold to the user and includes a second identifier for the mobile device, a second identifier for the smart card, and a second telecommunications carrier.

9. The system of claim 8, wherein the access device is configured to, during activation of the mobile device:
identify information associated with the first telecommunications carrier for configuring the mobile device; and
transmit to the mobile device the information associated with the first telecommunications carrier for configuring the mobile device.

10. The system of claim 8, where the mobile device is configured to:
detect when a first smart card installed in the mobile device is replaced with a second smart card; and
in response to the detected replacement of the first smart card with the second smart card, transmit to the access device a request to reconfigure the mobile device.

11. The system of claim 10, where the access device is further configured to:
receive from the mobile device the request to reconfigure the mobile device;
determine for the mobile device a different, third telecommunications carrier from a number of telecommunications carriers;
identify information associated with the different, third telecommunications carrier for reconfiguring the mobile device; and
transmit to the mobile device the information associated with the different, third telecommunications carrier for reconfiguring the mobile device.

12. The system of claim 11, where the mobile device is further configured to:
receive the information associated with the different, third telecommunications carrier; and
reconfigure the mobile device using the received information associated with the different, third telecommunications carrier.

13. The system of claim 12, where reconfiguring the mobile device further comprises:
reconfiguring one or more hardware components or a software stack of the mobile device.

14. A non-transitory computer-readable medium including one or more sequences of instructions which, when executed by one or more processors, causes:
during activation of a mobile device, where activation includes connecting the mobile device to an access device:
receiving, at the access device, an activation request to activate the mobile device, where the activation request includes a first identifier for the mobile device and a first identifier for a smart card in the mobile device;
receiving, at the access device and from a device operational repository, information identifying a first telecommunications carrier specified for the smart card in the mobile device when the mobile device was manufactured, the device operational repository storing data associated with a retail outlet to where the mobile device was shipped from a manufacturer;
sending, from the access device to a telecommunications carrier account repository for the first telecommunications carrier, an authentication request, where the authentication request includes authentication information; and receiving, at the access device and in response to the authentication request, an authorization to activate the mobile device for the first telecommunications carrier when the authentication information matches information associated with the mobile device in the telecommunications carrier account repository, where the information associated with the mobile device in the telecommunications carrier account repository for the first telecommunications carrier is specified when the mobile device was sold to a user and includes a second identifier for the mobile device, a second identifier for the smart card, and a second telecommunications carrier.

15. The non-transitory computer-readable medium of claim 14, where the authentication information includes the first identifier for the mobile device, the first identifier for the smart card, and the information obtained from the device operational repository.

16. The non-transitory computer-readable medium of claim 15, where the authentication information matches the information associated with the mobile device in the telecommunications carrier account repository when the first identifier for the mobile device matches the second identifier for the mobile device, the first identifier for the smart card matches the second identifier for the smart card, and the first telecommunications carrier matches the second telecommunications earlier.

17. The non-transitory computer-readable medium of claim 14, further comprising instructions that cause:
reconfiguring a software stack of the mobile device or reconfiguring one or more hardware components of the mobile device in response to receiving the authorization to activate the mobile device.

18. The non-transitory computer-readable medium of claim 14, where the activation request is transmitted from the mobile device to the access device in response to detecting that a first smart card installed in the mobile device is replaced with a second smart card.

19. The non-transitory computer-readable medium of claim 18, further comprising instructions that cause:
notifying one or more applications on the mobile device of the replacement of the first smart card with the second smart card.

20. The non-transitory computer-readable medium of claim 18, further comprising instructions that cause:
reconfiguring one or more applications on the mobile device based on the received information associated with a different telecommunications carrier.

* * * * *